United States Patent [19]

DeChristopher

[11] Patent Number: 5,004,350
[45] Date of Patent: Apr. 2, 1991

[54] ROLLER FOR FORMING A DOUGH BALL INTO A PIZZA SHELL

[76] Inventor: Eugene L. DeChristopher, 20 Ahlstrom Rd., Cotati, Calif. 94928

[21] Appl. No.: 551,316

[22] Filed: Jul. 12, 1990

[51] Int. Cl.$^5$ .............................................. B29B 1/06
[52] U.S. Cl. ..................................... 366/69; 29/121.1; 29/121.8; 99/450.1
[58] Field of Search .................. 366/69, 71, 72, 73, 366/74, 348, 349; 99/450.1; 426/443; 29/110, 110.5, 121.1, 121.6, 121.5, 121.8, 121.7

[56] References Cited

U.S. PATENT DOCUMENTS

| | | | |
|---|---|---|---|
| 730,124 | 6/1903 | Hugunin | 366/69 |
| 819,772 | 5/1906 | Latham | 366/69 |
| 2,485,428 | 10/1949 | Bleier | 29/121.2 |
| 2,518,785 | 8/1950 | Houk | 29/121.2 |
| 4,718,769 | 1/1988 | Conkey | 29/110.5 |
| 4,815,859 | 3/1989 | Weinkle | 29/110.5 |

*Primary Examiner*—Robert W. Jenkins

[57] ABSTRACT

A polyhedron roll for bread dough is formed from a sheet of semirigid plastic material with score lines forming isosceles triangles, alternately inverted and upright across the central portion and inverted isosceles triangles depending from the score line bases of the upright triangles of the central row. The bottom row of triangles are folded in and joined together side by side by complementary fastening means and the triangles of the intermediate row are folded around to form a ring, with complementary fastening means on the end most members being secured. Truncated isosceles triangles may be joined by the score lines along the top edge of the central strip with complementary means attaching them together side by side to complete and reinforce the core with a central opening in the top. A stem extends down through the central opening and is secured to the interior of the core to enable the core to be rocked. A cluster of three balls is secured to each of the triangular panels in the central and bottom rows to knead and indent a dough ball as it is rocked over them.

6 Claims, 3 Drawing Sheets

ROLLER FOR FORMING A DOUGH BALL INTO A PIZZA SHELL

BACKGROUND OF THE INVENTION

Traditionally, pizza shells have been formed by pressing, kneading and stretching a ball of proofed dough by hand into a relatively thin shell with a relatively thick rim. Generally, efforts to automate this process of kneading dough have not been successful in that the devices involved do not accurately simulate the manipulation of the human fingers. Some automated devices simply flatten and squeeze the dough between a pair of rollers or between plates of a hydraulic press, so that any gas pockets in the dough tend to be flattened and ruptured. As a result, the pizza shell is not light and fluffy but flat, dense and heavy. In my previous, co-pending application Ser. No. 07/430,430, filed Nov. 2, 1989, now U.S. Pat. No. 4,936,686, for "Spherical Roller for Kneading a Dough Ball" I show a generally spherical roller including a cluster of balls on the outer surface to form spaced depressions or dimples as the roller is pressed and rolled over the dough ball. In another of my co-pending applications, Ser. No. 07/408,918 filed Sept. 18, 1989, now U.S. Pat. No. 4,944,596, for "Apparatus with Roller for Kneading a Proofed Ball of Dough" I show a cylindrical roller having closely nested balls over the surface thereof. In tests, such spherical and cylindrical rollers have worked well, but being made of a molded, rigid plastic with rigid integral balls, they are somewhat unyielding as they press into and work the dough.

OBJECTS OF THE INVENTION

It is an object of this invention to provide a roller for forming a dough ball into a pizza shell on a production basis without compressing the dough.

It is a further object of this invention to provide a roller for producing pizza shells which simulates the workings of the human fingers in pressing spaced dimples into the dough.

It is a further object of this invention to provide a roller for working a dough ball with spaced spherical nodules that are somewhat yielding and resilient.

It is a further object of this invention to provide a roller for working a dough ball that is economical to manufacture and reliable in operation.

Other objects and advantages of this invention will become apparent from the description to follow, particularly when read in conjunction with the accompanying drawings.

SUMMARY OF THE INVENTION

In carrying out this invention I assemble a generally spherical roller from a scored flat blank molded of a semirigid plastic material. The score lines, which may be molded into the plastic, form a central row of nested equilateral triangles, alternately upright and inverted. On the top of this central row is a row of upright equilateral triangles with their bases coincident with those of the inverted triangles of the central row, and below the central row is a series of inverted triangles sharing the bases of the upright triangles of the central row. Complementary attaching means are formed on the two endmost triangles of the central row so that the central row can be formed and secured in a ring, and the top and bottom row triangles are all formed with fastening means so that the triangles can be secured together side by side to form a complete polyhedron. The triangles in the top row are truncated so that, when secured together an opening is formed in the top of the polyhedron. Each triangular panel is formed with strengthening ribs and with means to secure thereto three dough-working balls.

DESCRIPTION OF A PREFERRED EMBODIMENT

Figure 1:
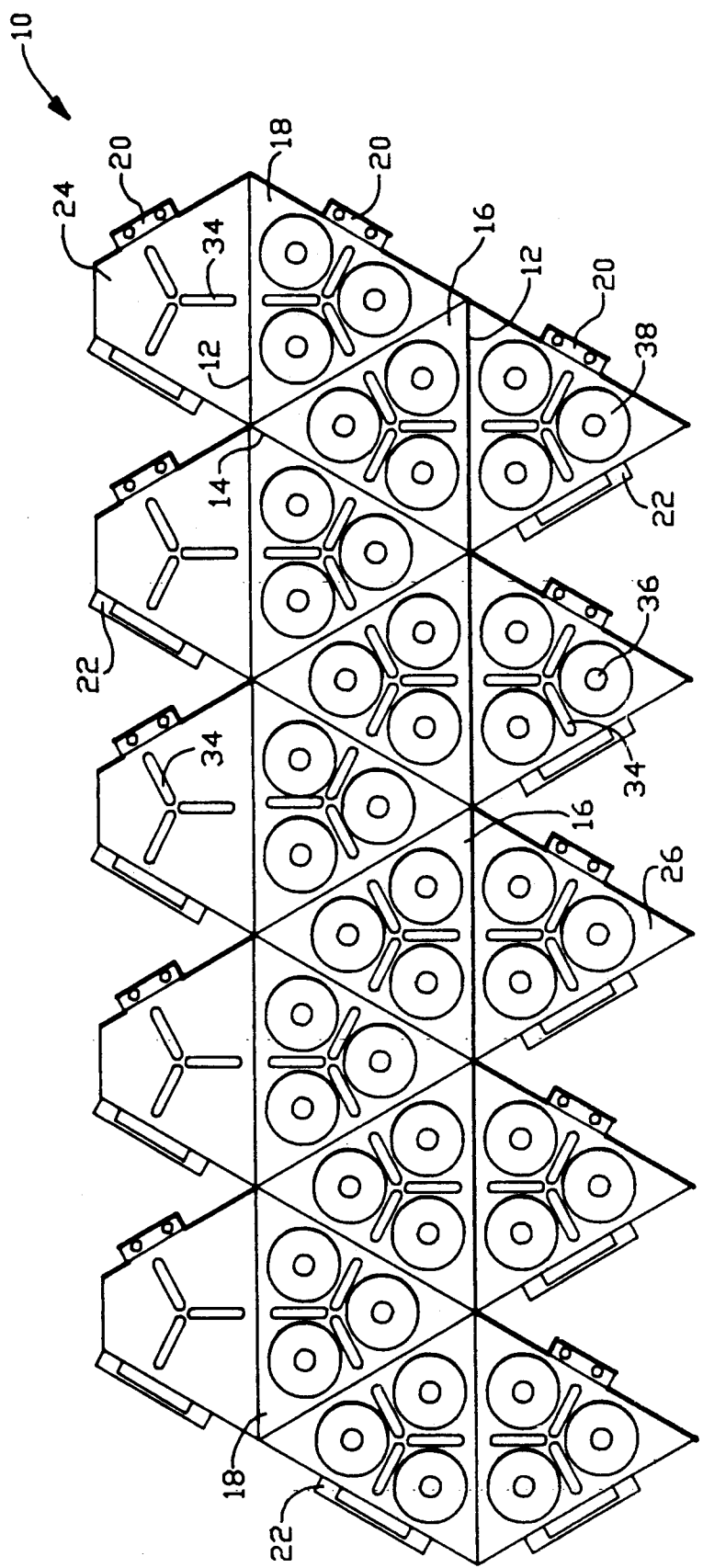
FIG. 1 is a plan view of a flat, plastic, scored blank of sheet material from which the roller of this invention is formed.

Referring now to FIG. 1 with greater particularity, there is shown a pre-cut blank 10 of a semirigid plastic sheet material, which may be approximately ⅛ inch in thickness. The blank 10 is molded with horizontal score lines 12 and diagonal score lines 14 forming an intermediate row of nested equilateral triangles 16 and 18, which are alternately upright and inverted. Complementary, interlocking tabs 20 and 22 are carried on the two endmost triangles 16 and 18 so that this intermediate row of triangles may be bent around and formed into a ring and maintained in that form by interlocking the tabs 20 and 22. Along the bottom score line of the intermediate row 16 of upright triangles is a series of inverted equilateral triangles 26 with their bases 12 coinciding with those of the upright triangles in the intermediate row. Along the top of the intermediate row is a series of truncated upright equilateral triangles 24. Both top and bottom rows of triangles 24 and 26 are provided with complementary interlocking tabs 20 and 22 which enable the top and bottom rows to be folded in and joined together side by side to form the top and bottom domes 24 and 26 of a polyhedron roller core 30 with the upper row of truncated triangles leaving an opening 29 at the top thereof to receive a rocking stem 32 (FIG. 2).

Integrally molded on at least one side of each triangular panel 16, 18, 24 and 26 are strengthening ribs 24, and molded on the outer face of the full triangles 16, 18 and 24 are small, integral pedestals 36 on which are supported three or more balls 38. In addition small holes 39 may be drilled at the apexes of the polyhedron to receive the stem 36 of additional balls and thus fill any gaps.

Figure 2:
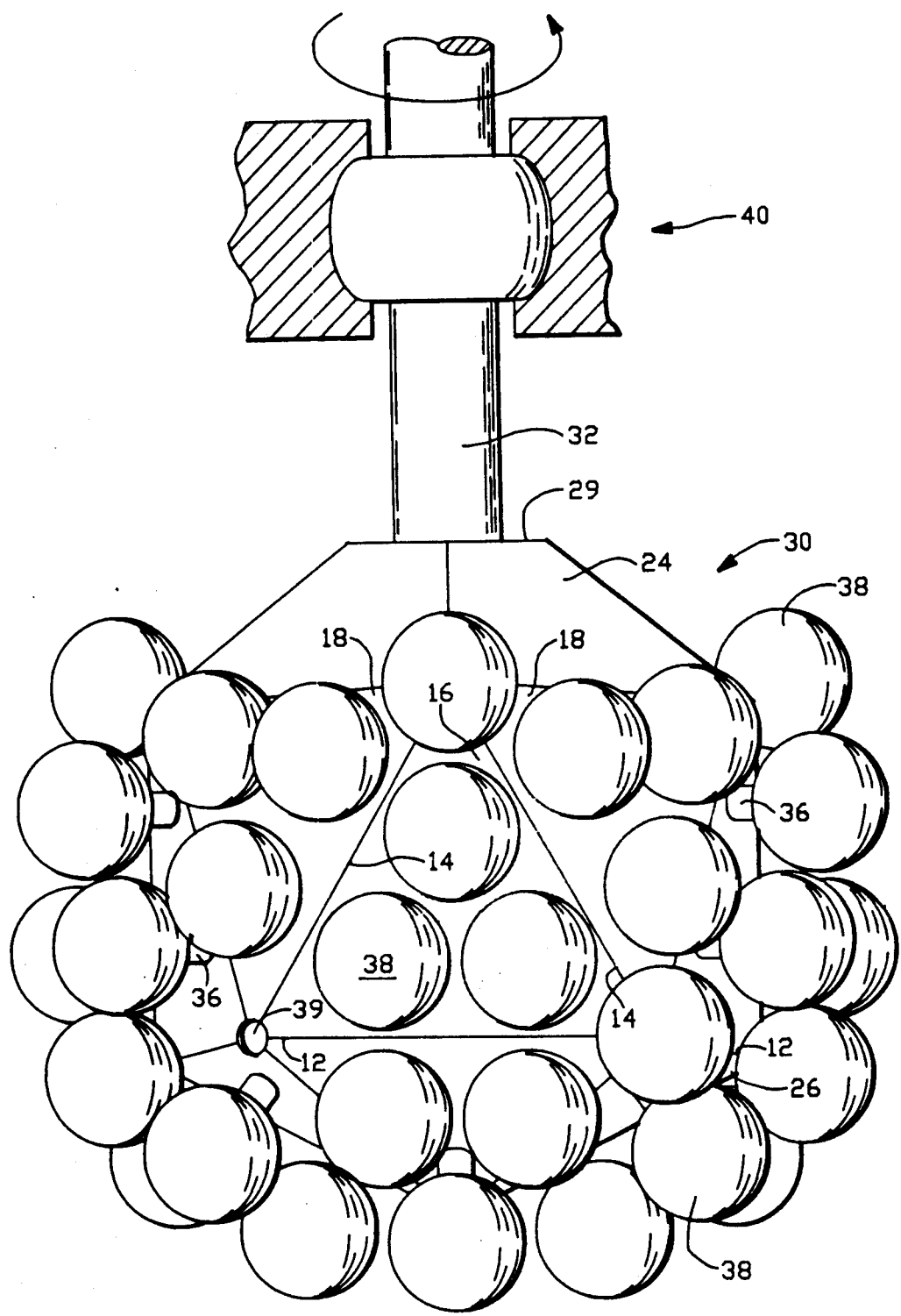
FIG. 2 is a view in perspective of a polyhedron formed from the blank of FIG. 1.

When the triangular panels are folded and assembled as shown in FIG. 2, the outer surfaces of the balls 38 define substantially a sphere that can be rocked or oscillated over a proofed dough ball by moving the stem 32 through generally a circular path, as indicated by the arrow in FIG. 2, the stem being mounted at 40 in a ball and socket bearing.

Figure 3:
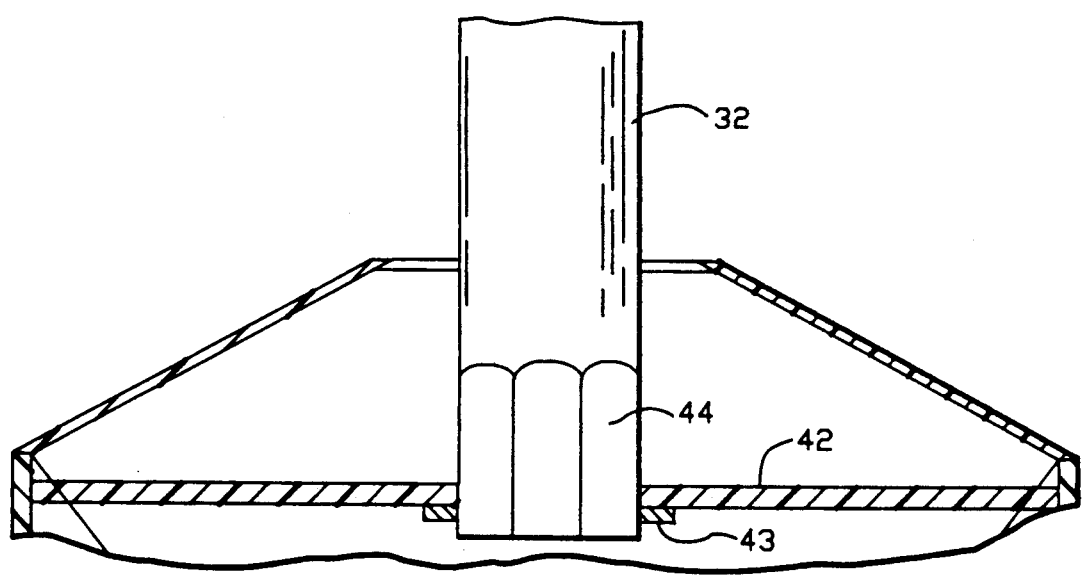
FIG. 3 is a partial section view of the polyhedron roller.

As the polyhedron 30 is being formed one or more stiffener panels 42 of (FIG. 3) appropriate polygonal configuration may be inserted, preferably at the intermediate row level to strengthen the polyhedron. The re-enforcing panel or panels 42 may be of the same plastic material, as that of the polyhedron 30, which will allow the polyhedron panels to yield somewhat but not collapse. For example, in the polyhedron of FIG. 2, there may be a pentagonal panel 42 held in place by a clip 43, reinforcing the center section 24 and 26 near both the top and bottom peripheral score lines 12 to conform to the pentagonal configuration of the polyhedron 30 at those levels. The stem 32 may be formed of a polygonal cross section 44 at its lower end to interlock or key with the complementary openings in one or both reinforcing panels 42 so that the polyhedron will oscillate and rock with it.

Figure 4:
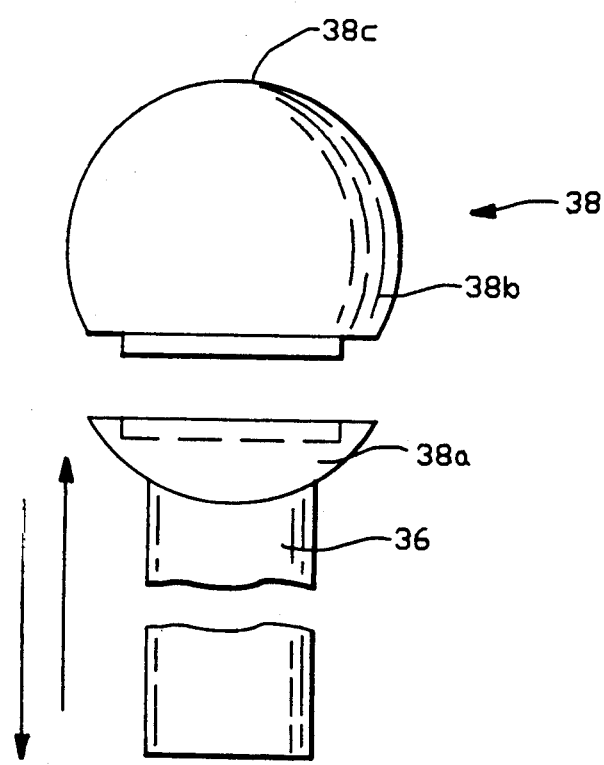
FIG. 4 is an enlarged view of the dough-working plastic balls.

Referring now to FIG. 4, the small balls 38 supported on pedestals 36 may be formed in two sections, section 38a, which is integral with the pedestal 36 and upper section 38b, which may be removed for cleaning. In use, the sections 38a and 38b are simply snapped together to form a small ball. Depending on the number of balls and their positions on each polygonal panel, the pedestals 36 may be made of varying heights so that the outer surfaces 38c precisely define a sphere.

While this invention has been described in conjunction with a preferred embodiment thereof, it is obvious that modifications and changes therein may be made by those skilled in the art to which it pertains without departing from the spirit and scope of this invention, as defined by the claims appended hereto.

What is claimed as invention is:

1. A roller for kneading and shaping a dough ball into a pizza shell comprising:
   a polyhedron core formed from a flat blank of a semi-rigid sheet material;
   said core having a central, circumferential row of alternately upright and inverted isosceles triangular panels joined by score lines; and
   a bottom row of inverted isosceles triangular panels with their bases coinciding with the second bases of the upright isosceles triangular panels of said central row;
   first complementary fastening means on the endmost panels of said central row releaseably secured together to form a central ring;
   second complementary fastening means releaseably securing the side edges of said bottom row of panels together to form a shell with said central row of panels;
   at least one pedestal secured to the outer face of each of said triangular panels;
   a ball carried on the top of each of said pedestals.
2. The roller defined by claim 1 wherein:
   there are three pedestals, each carrying a ball on each of said panels.
3. The roller defined by claim 2 wherein:
   the heights of said pedestals are determined so that points on the outer surfaces of said balls define a sphere.
4. The roller defined by claim 1 wherein said semi-rigid sheet material is a plastic material.
5. The roller defined by claim 4 including:
   strengthening ribs protruding from a surface of each of said triangular panels.
6. The roller defined by claim 1 including:
   a central stem extending into said polyhedron core and secured thereto to enable said core to be rocked on the outer surfaces of said balls.

* * * * *